2,875,232

PHOSPHONOALKANAMIDES PREPARED FROM PHOSPHITES AND LACTAMS

Richard L. McConnell and Harry W. Coover, Jr., Kingsport, Tenn., assignors to Eastman Kodak Company, Rochester, N. Y., a corporation of New Jersey Application February 14, 1956, Serial No. 565,323

5 Claims. (Cl. 260—461)

This invention relates to novel derivatives of phosphorus and to a method of preparing the novel compounds. In a specific aspect this invention relates to novel phosphonoalkanamides and to a method of preparing such novel compounds.

The novel phosphorus derivatives prepared in accordance with the process to be described below are useful as plasticizers, solvents, pesticides and intermediates for the preparation of other organophosphorus compounds.

The novel compounds of this invention have the following structural formula:

$$\begin{array}{c} R_1O \\ \diagdown \\ R_2O \end{array} \overset{O}{\underset{\|}{P}} - CH_2(CH_2)_n - \overset{O}{\underset{\|}{C}} - N \overset{H}{\underset{R_3}{\diagdown}}$$

where $R_1$ and $R_2$ are selected from the group consisting of alkyl and aryl, $R_3$ is selected from the group consisting of hydrogen, alkyl and aryl and $n$ is an integer of 2, 3 or 4. In many instances, $R_1$ and $R_2$ are the same, but in some instances, $R_1$ and $R_2$ represent different alkyl or aryl radicals. Among the alkyl radicals that are represented by $R_1$, $R_2$ and $R_3$ above are methyl, ethyl, propyl, butyl, pentyl, hexyl and the like. Among the aryl radicals represented by $R_1$, $R_2$ and $R_3$ above are phenyl, tolyl, xylyl, ethylphenyl, propylphenyl and the like.

The novel products of this invention can be prepared by reacting a lactam with a dialkyl or diaryl phosphite. The lactam that is employed in the process can be represented by the following structural formula:

$$\begin{array}{c} CH_2(CH_2)_nC=O \\ | \qquad\qquad | \\ \underline{\quad N \quad} \\ | \\ R_3 \end{array}$$

where $R_3$ is as described above and $n$ is an integer of 2, 3 or 4. The phosphite that is employed to produce these novel products can be represented by the following structural formula:

$$\begin{array}{c} R_1O \\ \diagdown \\ R_2O \end{array} \overset{O}{\underset{}{\diagup}} P - H$$

wherein $R_1$ and $R_2$ are as defined above.

The reaction can be carried out by heating a mixture of the lactam and phosphite in the presence or absence of an inert solvent. Although equimolar quantities of the reactants will produce the desired phosphonoalkanamides, it is preferable to employ an excess of the phosphite to minimize polymerization of the lactam during the reaction. The preferred temperature range is 100 to 250° C. and the reaction time is within the range of 1 to 24 hours, depending upon the particular lactam and phosphite being reacted.

Among the inert solvents that can be used to practice the invention, are toluene, xylene, chlorobenzene, dibutyl ether and tetrachloroethane.

The following examples are illustrative of this invention. In all the examples the various parts indicated are in parts-by-weight.

Example 1

22.6 parts of caprolactam and 55.2 parts of diethyl hydrogen phosphite were mixed and heated at 160° C. for 8 hours. After removing the excess diethyl hydrogen phosphite, 6-diethylphosphonohexanamide was recovered as a water-white liquid. The boiling point of the product was 105 to 108° C. at 0.5 to 1.0 mm. pressure; $n_D^{20}$ 1.4418; $d_4^{20}$ 1.0608. The reaction for this example can be represented as follows:

$$\begin{array}{c} C_2H_5O \\ \diagdown \\ C_2H_5O \end{array} \overset{O}{\underset{\|}{P}} - H + CH_2(CH_2)_4 - C=O \longrightarrow$$
$$\underline{\qquad NH \qquad}$$

$$\begin{array}{c} C_2H_5O \\ \diagdown \\ C_2H_5O \end{array} \overset{O}{\underset{\|}{P}} - CH_2(CH_2)_4 - \overset{O}{\underset{\|}{C}} - NH_2$$

6-diethylphosphonohexanamide

Example 2

22.6 parts of caprolactam and 77.5 parts of dibutyl hydrogen phosphite were reacted in accordance with the procedure of Example 1 to produce 6-dibutylphosphonohexanamide. The product boiled at 115 to 119° C. at 1.0 mm. pressure. The reaction of this example can be represented as follows:

$$\begin{array}{c} C_4H_9O \\ \diagdown \\ C_4H_9O \end{array} \overset{O}{\underset{\|}{P}} - H + CH_2(CH_2)_4 - C=O \longrightarrow$$
$$\underline{\qquad NH \qquad}$$

$$\begin{array}{c} C_4H_9O \\ \diagdown \\ C_4H_9O \end{array} \overset{O}{\underset{\|}{P}} - CH_2(CH_2)_4 - \overset{O}{\underset{\|}{C}} - NH_2$$

6-dibutylphosphonohexanamide

Example 3

17 parts of 2-pyrrolidone and 55.2 parts of diethyl hydrogen phosphite were reacted in accordance with the procedure of Example 1 to produce 4-diethylphosphonobutyramide. The reaction product boiled at 95 to 98° C. at 0.5 mm. pressure. The reaction for this example can be represented as follows:

$$\begin{array}{c} C_2H_5O \\ \diagdown \\ C_2H_5O \end{array} \overset{O}{\underset{\|}{P}} - H + CH_2(CH_2)_2 - C=O \longrightarrow$$
$$\underline{\qquad NH \qquad}$$

$$\begin{array}{c} C_2H_5O \\ \diagdown \\ C_2H_5O \end{array} \overset{O}{\underset{\|}{P}} - CH_2(CH_2)_2 - \overset{O}{\underset{\|}{C}} - NH_2$$

4-diethylphosphonobutyramide

Example 4

19.8 parts of N-methyl-2-pyrrolidone and 55.2 parts of diethyl hydrogen phosphite were reacted according to the procedure of Example 1 to produce N-methyl 4-diethylphosphonobutyramide. The reaction product boiled at 94 to 97° C. at 0.7 mm. pressure. The reaction for this example can be represented as follows:

$$\begin{array}{c} C_2H_5O \\ \diagdown \\ C_2H_5O \end{array} \overset{O}{\underset{\|}{P}} - H + CH_2(CH_2)_2 - C=O \longrightarrow$$
$$\begin{array}{c} \underline{\qquad N \qquad} \\ | \\ CH_3 \end{array}$$

$$\begin{array}{c} C_2H_5O \\ \diagdown \\ C_2H_5O \end{array} \overset{O}{\underset{\|}{P}} - CH_2(CH_2)_2 - \overset{O}{\underset{\|}{C}} - \overset{H}{\underset{}{N}} - CH_3$$

N-methyl 4-diethylphosphonobutyramide

Example 5

22.6 parts of caprolactam and 81.2 parts of diphenyl hydrogen phosphite were reacted according to the procedure of Example 1 to produce 6-diphenylphosphonohexanamide which is a very viscous semi-solid material. The reaction for this example can be represented as follows:

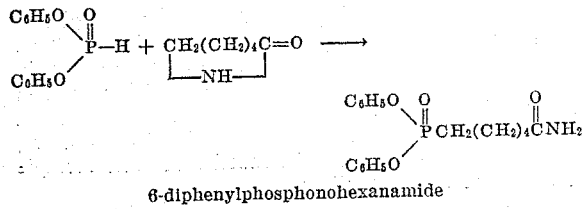

6-diphenylphosphonohexanamide

Example 6

17 parts of 2-pyrrolidone and 55.2 parts of diphenyl hydrogen phosphite were reacted in accordance with the procedure of Example 1 to produce 4-diphenylphosphonobutyramide. The reaction for this example can be represented as follows:

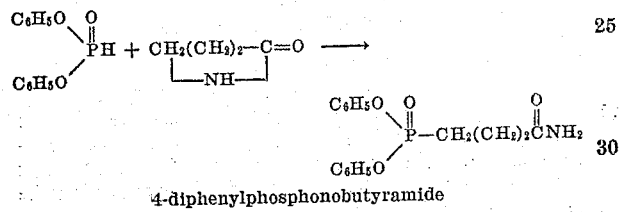

4-diphenylphosphonobutyramide

Example 7.—Use of phosphonoalkanamides as plasticizers for cellulose esters

A. A mixture of 50 parts of cellulose acetate powder and 20 parts of 6-diethylphosphonohexanamide from Example 1 was roll compounded and pressed into a thin transparent plate (50 mil thickness). This sheet of plastic was transparent, quite flexible, and well plasticized. It had an M flow as determined by ASTM Method D569-48. It is well known in the art that cellulose acetate cannot be formed into a plasitc sheet without the aid of a plasticizer. The plastic sheet containing the 6-diethylphosphonohexanamide was completely self-extinguishing as determined by ASTM Method D635-44.

A similar sheet of cellulose acetate which was plasticized with a conventional plasticizer, diethyl phthalate, burned completely when ignited.

When 50 parts of cellulose acetate was mixed with 20 parts of 6-dibutylphosphonohexanamide (Example 2), roll compounded, and compression molded, a transparent plastic sheet was obtained which had an MH flow.

Plastic sheets containing 20 parts of 4-diethylphosphonobutyramide (Example 3) or N-methyl 4-diethylphosphonobutyramide (Example 4) for each 50 parts of cellulose acetate had properties similar to those described for cellulose acetate containing 6-diethylphosphonohexanamide.

The flow of the plastic may be varied either by varying the concentration of the phosphonoalkanamide plasticizer or by using a co-plasticizer such as diethyl phthalate, tripropionin, or triethyl phosphate.

B. The diphenylphosphonoalkanamides are plasticizers for cellulose acetate butyrate. When cellulose acetate butyrate (50 parts) was roll compounded and compression molded with 7½ parts of 6-diphenylphosphonohexanamide (Example 5) a transparent, well plasticized sheet of plastic having an M flow was obtained. This sample was not self-extinguishing but did have a greatly reduced burning rate when compared to a sample of cellulose acetate butyrate which was plasticized with dioctyl phthalate.

The 4-diphenylphosphonobutyramide (Example 6) gave similar plasticizing action in cellulose acetate butyrate.

We claim:

1. A process for producing a phosphonoalkanamide which comprises reacting a phosphite having the structural formula:

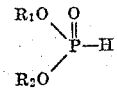

wherein $R_1$ and $R_2$ are selected from the group consisting of alkyl radicals containing from 1 to 4 carbon atoms and phenyl with a lactam having the structural formula:

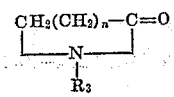

wherein $R_3$ is selected from the group consisting of hydrogen, methyl and $n$ is an integer of 2 to 4 at a temperature within the range of 100–250° C.

2. A process for producing 6-diethylphosphonohexanamide which comprises reacting caprolactam with diethyl hydrogen phosphite at a temperature within the range of 100 to 250° C.

3. A process for producing 6-dibutylphosphonohexanamide which comprises reacting caprolactam with dibutyl hydrogen phosphite at a temperature within the range of 100 to 250° C.

4. A process for producing 4-diethylphosphonobutyramide which comprises reacting 2-pyrrolidone with diethyl hydrogen phosphite at a temperature within the range of 100 to 250° C.

5. A process for producing N-methyl-4-diethylphosphonobutyramide which comprises reacting N-methyl-2-pyrrolidone with diethyl hydrogen phosphite at a temperature within the range of 100 to 250° C.

References Cited in the file of this patent

UNITED STATES PATENTS

| 2,668,800 | Johnston | Feb. 9, 1954 |
|---|---|---|
| 2,754,320 | Johnston | July 10, 1956 |